United States Patent [19]

Oda et al.

[11] 4,218,257

[45] Aug. 19, 1980

[54] SINTERED SILICON NITRIDE BODY AND A METHOD OF PRODUCING THE SAME

[75] Inventors: Isao Oda, Nagoya; Masayuki Kaneno, Tokoname, both of Japan

[73] Assignee: NGK Insulators, Ltd., Nagoya, Japan

[21] Appl. No.: 933,403

[22] Filed: Aug. 14, 1978

Related U.S. Application Data

[62] Division of Ser. No. 672,928, Apr. 2, 1976, Pat. No. 4,134,947.

[30] Foreign Application Priority Data

Apr. 7, 1975 [JP] Japan .................................. 50-41164
Apr. 18, 1975 [JP] Japan .................................. 50-46518

[51] Int. Cl.$^2$ ............................................. C04B 35/58
[52] U.S. Cl. ................................................... 106/73.5
[58] Field of Search ......................................... 106/73.5

[56] References Cited

U.S. PATENT DOCUMENTS

| | | | |
|---|---|---|---|
| 3,833,389 | 9/1974 | Komeya et al. | 106/65 |
| 4,117,095 | 9/1978 | Komeya et al. | 106/73.5 |
| 4,119,475 | 10/1978 | Prochazka et al. | 106/73.5 |

Primary Examiner—O. R. Vertiz
Assistant Examiner—Mark Bell
Attorney, Agent, or Firm—Sughre, Rothwell, Mion, Zinn & Macpeak

[57] ABSTRACT

A sintered silicon nitride body consists of not more than 10% by weight in total of at least two metal oxides selected from the group consisting of beryllium oxide, magnesium oxide and strontium oxide (provided that each of the metal oxides is not more than 5% by weight) and the remainder of silicon nitride and may further contain not more than 10% by weight of at least one rare earth metal oxide, and is produced by preparing a mixture having the said composition range and then molding and sintering it at 1,600°–1,900° C. in nitrogen or inert gas atmosphere.

14 Claims, 11 Drawing Figures

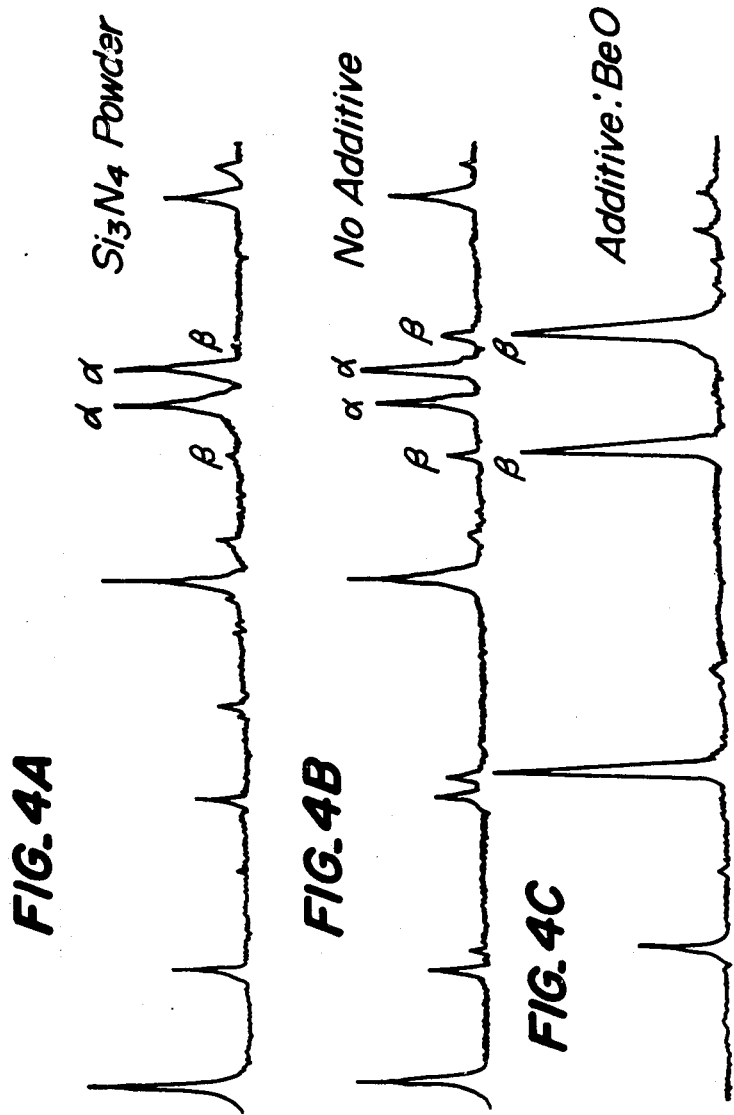

SINTERED SILICON NITRIDE BODY AND A METHOD OF PRODUCING THE SAME

CROSS REFERENCE TO RELATED APPLICATION

This application is a divisional application of U.S. application Ser. No. 672,928, filed Apr. 2, 1976 by the same inventors and entitled A Sintered Silicon Nitride Body and a Method of Producing the Same, now U.S. Pat. No. 4,134,947, issued Jan. 16, 1979.

BACKGROUND OF THE INVENTION

1. Field of the Invention

This invention relates to silicon nitride, and more particularly relates to a high density sintered silicon nitride body having improved mechanical strength and thermal shock resistance and a method of producing the same.

2. DESCRIPTION OF THE PRIOR ART

Recently, silicon nitride ($Si_3N_4$) is particularly remarked as high-temperature structural materials such as gas turbine parts and the like because it has excellent mechanical strength, thermal resistance and thermal shock resistance. Because of poor sinterability, silicon nitride is generally difficult to obtain a sintered body having high density and high mechanical strength. As a method of producing the sintered silicon nitride body, therefore, there have been reported a reaction-sintering method wherein silicon is sintered on nitriding, and a hot-pressing method wherein silicon nitride powder is hot pressed after added with sintering aids such as magnesium oxide (MgO) and the like, for instance, by G. G. Deeley et al, "Dense Silicon Nitride," *Powder Metallurgy*, 1961, No. 8, pp. 145–151. In the reaction-sintering method, however, high density sintered body cannot be obtained because shrinkage on sintering is hardly caused. Further, in the hot-pressing method, sintered bodies having high density and mechanical strength are produced, but the method is not available for fabricating dense silicon nitride bodies with complex shapes due to restrictions associated with this method and also the production cost becomes expensive.

Furthermore, a method of producing sintered silicon nitride body, wherein silicon nitride powders are added with magnesium oxide as sintering aids and subjected to a usual sintering treatment without press, has been reported, for instance, by G. R. Terwilliger, "Properties of Sintered $Si_3N_4$," Journal of the American Ceramic Society, 1974, Vol. 57, No. 1, pp. 48–49. In this method, however, the density is insufficient and the mechanical strength, especially at high temperatures, is small and hence thermal shock resistance is small. Therefore, the sintered body obtained by this method is not suitable for high-temperature structural materials.

SUMMARY OF THE INVENTION

An object of the invention is to provide a sintered silicon nitride body having high density and improved mechanical strength and thermal shock resistance.

Another object of the invention is to provide a method of producing the aforesaid sintered silicon nitride body.

A further object of the invention is to provide a method of producing a sintered silicon nitride body by a usual sintering method.

According to a first aspect of the invention there is provided a sintered silicon nitride body consisting essentially of not more than 10% by weight in total of at least two metal oxides selected from the group consisting of beryllium oxide (BeO), magnesium oxide (MgO) and strontium oxide (SrO), provided that each of the metal oxides is not more than 5% by weight, and the remainder of silicon nitride. The sintered silicon nitride body may further contain not more than 10% by weight of at least one rare earth metal oxide.

According to a second aspect of the invention, there is provided a method of producing a sintered silicon nitride body which comprises preparing a mixture of not more than 10% by weight in total of at least two metal oxides selected from the group consisting of beryllium oxide, magnesium oxide and strontium oxide, provided that each of the metal oxides is not more than 5% by weight, and the remainder of silicon nitride powder; molding the mixture into a shaped body; and sintering the shaped body at a temperature of 1,600°–1,900° C. in nitrogen or inert gas atmosphere. In another embodiment of the invention, not more than 10% by weight of at least one rare earth metal oxide may be further added to the mixture.

BRIEF DESCRIPTION OF THE DRAWINGS

The invention will now be described in greater detail with reference to the accompanying drawings, wherein:

FIGS. 4A–4E are X-ray diffraction patterns of silicon nitride powder, sintered silicon nitride body containing no additive, sintered silicon nitride body containing beryllium oxide as an additive, sintered silicon nitride body containing magnesium oxide as an additive and sintered silicon nitride body containing strontium oxide as an additive, respectively;

DETAILED DESCRIPTION OF THE PREFERRED EMBODIMENT

In general, it is known that silicon nitride powder have two crystal structures of $\alpha$-phase and $\beta$-phase. Furthermore, it is known that in the sintering of silicon nitride powder $\alpha$-phase is transformed to $\beta$-phase at a temperature above about 1,400° C. and the transformation rate becomes faster above 1,600°

. In other words, the sintering of silicon nitride powder proceeds with the transformation of $\alpha$-phase to $\beta$-phase. According to the invention, silicon nitride powder is used having an $\alpha$-phase content of not less than 30% by weight, a purity of not less than 99% and a grain size of not more than 10 $\mu$m. When the $\alpha$-phase content is less than 30% by weight, the sintering of the powder is not sufficiently caused because the sintering is closely related to the transformation of $\alpha$-phase to $\beta$-phase as mentioned above. Therefore, the $\alpha$-phase content in the silicon nitride powder is not less than 30% by weight, preferably not less than 80% by weight.

The reason why the purity is not less than 99% is as follows: that is, if impurity is present in the silicon nitride powder, this impurity evaporates to cause the formation of pores in the sintered body and also reacts with the additive to form a low-melting liquid phase, whereby high-temperature properties of the sintered body are considerably deteriorated. Therefore, it is desirable that the purity of the silicon nitride powder is not less than 99%.

Furthermore, because of poor sinterability, silicon nitride is necessary to reduce the grain size of the powder so as to increase the surface tension thereof. In this point, the finely divided powders having a grain size of not more than 10 μm are used as the silicon nitride powder.

According to the invention, at least two metal oxides selected from the group consisting of beryllium oxide, magnesium oxide and strontium oxide are used as a first additive in a total amount of not more than 10% by weight, provided that each of the metal oxides is used in an amount of not more than 5% by weight.

Figure 1:
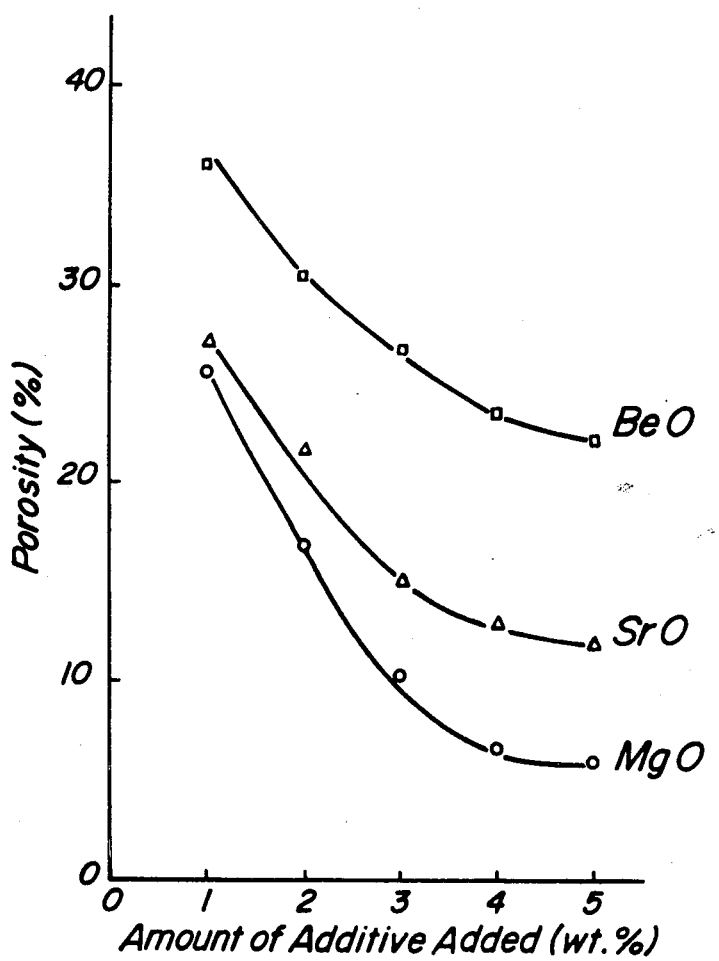
FIGS. 1–3 are graphs showing a relation between the amount of the additive added and the porosity of the resulting sintered silicon nitride body, respectively.

That is, if beryllium oxide, magnesium oxide and strontium oxide are separately added as the first additive to the silicon nitride powder, the amount of the additive added is related to the porosity of the resulting sintered silicon nitride body as shown in FIG. 1. These additives densify the sintered body to some extent due to the formation of grain boundary phase, but the density is still insufficient at the addition of each of these additives as apparent from FIG. 1. For instance, even if magnesium oxide as the most effective additive is used in an amount of 5% by weight, the minimum porosity is only achieved to be about 6% (i.e., 94% of theoretical density).

The inventors have surprisingly discovered that a combination of these metal oxides gives a remarkable effect as a sintering aid to the sintering of the silicon nitride powder. That is, as apparent from FIGS. 2 and 3, by using at least two metal oxides selected from the group consisting of beryllium oxide, magnesium oxide and strontium oxide as the first additive, the porosity of the sintered silicon nitride body is considerably reduced and hence the density increases.

Figure 2:
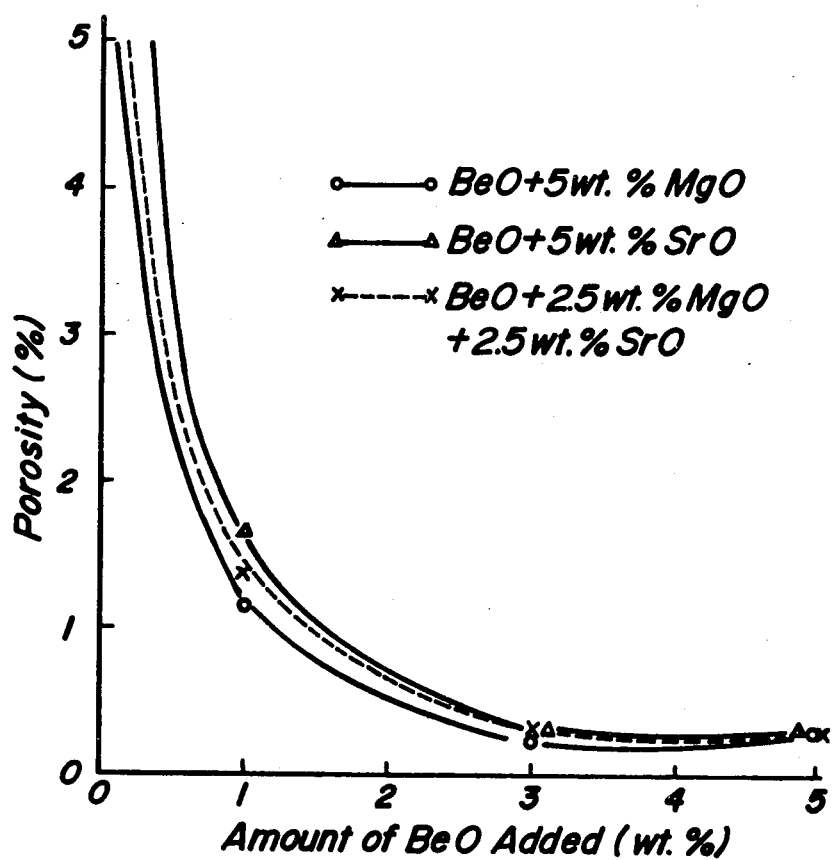

In FIG. 2 there is shown the relation between the amount of beryllium oxide added and the porosity of the resulting sintered silicon nitride body when beryllium oxide is added in admixture with 5% by weight of magnesium oxide or 5% by weight of strontium oxide or 2.5% by weight of magnesium oxide and 2.5% by weight of strontium oxide.

Figure 3:
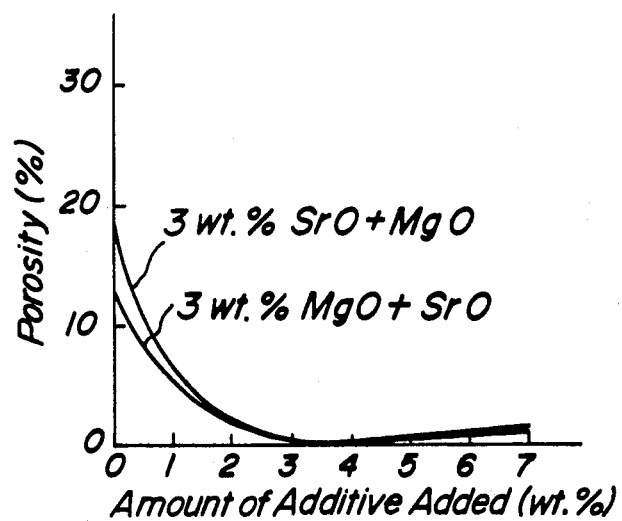

In FIG. 3 there is shown the relation between the amount of strontium oxide or magnesium oxide added and the porosity of the resulting sintered silicon nitride body when strontium oxide is added to 3% by weight of magnesium oxide or when magnesium oxide is added to 3% by weight of strontium oxide.

In FIGS. 2 and 3, the porosity was measured with respect to the sintered silicon nitride body obtained by mixing a mixture of silicon nitride powder and the metal oxide additive having a given composition in a ball mill for 1 hour, molding the mixture into a disc sample with a diameter of 10 mm and a thickness of 3 mm and then sintering the sample at 1,750° C. in an argon gas atmosphere for 1 hour.

According to the invention, the combination of these metal oxides as the first additive is particularly preferable to always contain beryllium oxide, i.e. combinations of BeO+MgO, BeO+SrO and BeO+MgO+SrO. Because, beryllium oxide is considerably effective for transformation of α-phase to β-phase in the silicon nitride powder as apparent from FIGS. 4A-4E.

FIG. 4A shows an X-ray diffraction pattern of silicon nitride powder having a purity of 99.9% and an α-phase content of 90% by weight and FIG. 4B shows an X-ray diffraction pattern of the sintered silicon nitride body obtained by sintering the powder at 1,750° C. for 1 hour.

FIGS. 4C-4E show X-ray diffraction patterns of the sintered silicon nitride body obtained by mixing the silicon nitride powder of FIG. 4A with 5% by weight of each of beryllium oxide, magnesium oxide and strontium oxide and then sintering the resulting mixture under the same conditions as described in FIG. 4B, respectively.

In these figures, symbol α represents diffraction peaks of α-phase and symbol β represents diffraction peaks of β-phase.

As seen from FIGS. 4B, 4D and 4E, α-phase still remains in the sintered body in case of no additive or in case of using only magnesium oxide or strontium oxide. On the contrary, as seen from FIG. 4C, almost of α-phase is transformed to β-phase in case of using beryllium oxide as the additive. Thus, beryllium oxide gives a remarkable effect to the sintering of silicon nitride powder because the sintering of the powder proceeds with the transformation of α-phase to β-phase as mentioned above.

The larger the amount of the first additive is, the higher the density of the sintered body. However, the excess of the additive forms a large amount of glassy phase between the silicon nitride grains, so that properties for high-temperature structural material are considerably damaged. Therefore, the total amount of at least two metal oxides is not more than 10% by weight, preferably 0.2-10% by weight, more particularly 1-7% by weight and the amount of each of the metal oxides is not more than 5% by weight, preferably 0.1-5% by weight, more particularly 0.5-3.5% by weight.

In order to obtain a high density sintered body, the sintering temperature above 1,600° C. is necessary, but when the temperature exceeds 1,900° C., the decomposition of silicon nitride occurs violently, so that the temperature above 1,900° C. is not preferable.

Furthermore, in order to prevent the decomposition and oxidation of silicon nitride, nitrogen or inert gas is preferably used as the sintering atmosphere.

According to the invention, at least one rare earth metal oxide may be further added in an amount of not more than 10% by weight as a second additive besides the first additive. The rare earth metal oxide includes cerium oxide ($CeO_2$), yttrium oxide ($Y_2O_3$), lanthanum oxide ($La_2O_3$), praseodymium oxide ($Pr_6O_{11}$), neodymium oxide ($Nd_2O_3$), samarium oxide ($Sm_2O_3$), gadolinium oxide ($Gd_2O_3$), dysprosium oxide ($Dy_2O_3$), holmium oxide ($Ho_2O_3$) and erbium oxide ($Er_2O_3$). When the amount of the rare earth metal oxide exceeds 10% by weight, the formation of glassy phase increases in the sintered body, so that said amount is not more than 10% by weight, preferably 1-10% by weight, more particularly 1-5% by weight.

The following examples are given in illustration of this invention and are not intended as limitations thereof.

EXAMPLE 1

To silicon nitride powder having purity, α-phase content and grain size shown in Table 1 was added the additive (metal oxides) shown in Table 1 with a special grade, and the resulting mixture was thoroughly mixed in a ball mill for 1 hour. Thereafter the mixture was pressed into a shaped body with a diameter of 40 mm and a thickness ,f 3 mm under a pressure of 2,000

Kg/cm² and then sintered ,t a temperature shown in Table 1 in nitrogen atmosphere for 1 hour. The porosity, modulus of rupture and thermal shock resistance of the thus obtained sintered silicon nitride body were measured to obtain a result as shown in Table 1.

$$\text{thermal shock resistance} = \frac{\text{modulus of rupture}}{\text{(thermal expansion coefficient)} \times \text{(Young's modulus)}}$$

Table 1

| Sample No. | | Silicon nitride Powder | | | Sintering temperature (°C.) | Additive (wt. %) | | | Porosity (%) | Modulus of rupture (Kg/cm²) | Thermal Shock resistance (°C.) |
|---|---|---|---|---|---|---|---|---|---|---|---|
| | | Purity (%) | α-phase (wt. %) | Grain Size (μm) | | BeO | MgO | SrO | | | |
| 1 | Present invention | 99.9 | 90 | ≦10 | 1,750 | 0.5 | 0.5 | — | 2.5 | 5,010 | 580 |
| 2 | Present invention | " | " | " | " | 1.0 | 1.0 | — | 1.8 | 5,160 | 600 |
| 3* | Present invention | " | " | " | " | 3.0 | 3.0 | — | 0.2 | 6,530 | 730 |
| 4 | Present invention | " | " | " | " | 5.0 | 5.0 | — | 0.3 | 6,100 | 680 |
| 5 | Present invention | " | " | " | " | 0.5 | — | 0.5 | 3.6 | 4,700 | 550 |
| 6 | Present invention | " | " | " | " | 1.0 | — | 1.0 | 2.4 | 5,050 | 590 |
| 7 | Present invention | " | " | " | " | 3.0 | — | 3.0 | 0.3 | 5,870 | 660 |
| 8 | Present invention | " | " | " | " | 5.0 | — | 5.0 | 0.3 | 5,670 | 630 |
| 9 | Present invention | " | " | " | " | 3.0 | 2.0 | 2.0 | 0.3 | 5,870 | 660 |
| 10 | Present invention | " | " | " | " | 5.0 | 2.5 | 2.5 | 0.2 | 5,720 | 640 |
| 11 | Present invention | " | 40 | " | " | 3.0 | 3.0 | — | 0.2 | 6,290 | 710 |
| 12 | Present invention | " | " | " | " | 3.0 | — | 3.0 | 0.3 | 5,810 | 650 |
| 13 | Present invention | " | 94 | " | 1,800 | — | 1.0 | 1.0 | 2.1 | 4,470 | 520 |
| 14** | Present invention | " | " | " | " | — | 3.0 | 3.0 | 0.2 | 5,860 | 660 |
| 15 | Present invention | " | " | " | " | — | 5.0 | 5.0 | 0.3 | 5,640 | 630 |
| 16 | Present invention | " | 90 | " | " | — | 4.0 | 0.5 | 0.8 | 4,860 | 550 |
| 17 | Present invention | " | " | " | " | — | 3.0 | 3.0 | 0.4 | 5,560 | 630 |
| 18 | Present invention | " | 80 | " | " | — | 0.5 | 4.0 | 1.0 | 4,700 | 540 |
| 19 | Present invention | " | " | " | " | — | 3.0 | 3.0 | 0.5 | 5,320 | 600 |
| 20 | Reference | " | 90 | " | 1,750 | 5.0 | — | — | 22.5 | 1,460 | 210 |
| 21 | " | " | " | " | " | — | 5.0 | — | 6.0 | 2,990 | 360 |
| 22 | " | " | " | " | " | — | — | 5.0 | 12.1 | 2,100 | 270 |
| 23 | " | " | " | " | 1,500 | 3.0 | — | 3.0 | 28.7 | 1,150 | 180 |
| 24 | " | " | " | " | " | — | — | 5.0 | 8.7 | 1,780 | 220 |
| 25 | " | " | " | " | " | — | 5.0 | — | 5.4 | 2,210 | 270 |
| 26 | " | " | " | " | " | — | 3.0 | 3.0 | 30.6 | 970 | 160 |
| 27 | " | " | " | " | 1,950 | — | 3.0 | 3.0 | 6.2 | 2,150 | 260 |
| 28*** | Prior art | 94.2 | 40 | ≦44 | 1,750 | 2% MgO + 7% Al₂O₃ + 5% SiO₂ | | | 0.4 | 2,960 | 330 |
| 29 | " | " | " | ≦10 | 1,800 | 3% MgO + 5% Al₂O₃ + 5% SiO₂ | | | 0.4 | 2,780 | 270 |
| 30 | " | " | " | " | " | 3% MgO + 5% Kibushi clay**** | | | 0.5 | 2,260 | 230 |

Figure 5:
FIGS. 5 and 6 are electron micrographs of the sintered silicon nitride bodies according to the invention, respectively.
Figure 6:
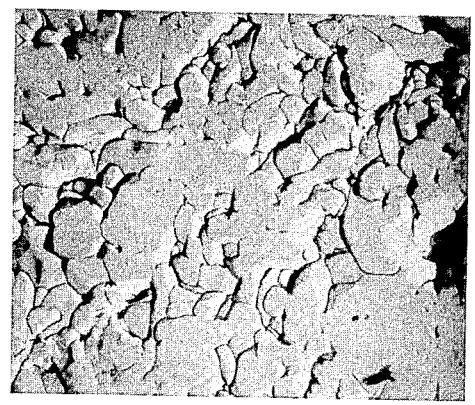
Figure 7:
FIG. 7 is an electron micrograph of the sintered silicon nitride body produced by the prior art.

*shown in FIG. 5,
**shown in FIG. 6,
***shown in FIG. 7,
****Kaolinite rich clay available Gifu Profecture of Japan.

In Table 1, sintered bodies of Sample Nos. 1–19 are within the scope of the invention, and those of Sample Nos. 20–27 are references.

For comparison, the properties of the sintered bodies obtained by the prior art are also shown in Table 1 as Sample Nos. 28–30.

After the modulus of rupture was measured on a test piece of 3×3×35 mm (span length: 30 mm) by a three-point bending test, the porosity was measured with the test piece. The thermal shock resistance was calculated from the following equation:

FIGS. 5 and 6 show electron micrographs (magnification 7,500 times) of sintered bodies of Sample Nos. 3 and 14 in Table 1, respectively, while FIG. 7 shows an electron micrograph (magnification 7,500 times) of the sintered body of Sample No. 28 in Table 1.

As seen from Table 1 and FIGS. 5–7, the sintered silicon nitride bodies according to the invention (Sample Nos. 1–19) are superior in the density, modulus of rupture and thermal shock resistance to those of references (Sample Nos. 20–27) and of the prior art (Sample Nos. 28–30).

On the contrary, the conventional sintered body of Sample No. 28 shown in FIG. 7 is not sufficient in strength though the porosity is decreased, because a large amount of glassy phase matrix is present in grain boundary of silicon nitride crystals.

EXAMPLE 2

A mixture of silicon nitride powder and additives shown in Table 2 was thoroughly mixed in a ball mill for 1 hour and formed into a shaped body with a diameter of 10 mm and a thickness of 50 mm under a pressure of 2,000 Kg/cm$^2$ and then sintered at a temperature shown in Table 2 in nitrogen atmosphere for 1 hour. The porosity, modulus of rupture and thermal shock resistance of the thus obtained sintered body were measured to obtain a result as shown in Table 2.

Table 2

| Sample No. | | Si$_3$N$_4$ powder | | | Additive (wt. %) | | | | Sintering temperature (°C.) | Porosity (%) | Modulus of rupture (Kg/cm$^2$) | Thermal Shock resistance (°C.) |
|---|---|---|---|---|---|---|---|---|---|---|---|---|
| | | Purity (%) | α-phase (wt. %) | Grain Size (μm) | BeO | MgO | SrO | Rare earth metal oxide | | | | |
| 1 | Present invention | 99.9 | 90 | ≦10 | 0.5 | 0.5 | — | CeO$_2$ 5.0 | 1,800 | 0.8 | 6,650 | 760 |
| 2 | Present invention | " | " | " | 1.5 | 2.0 | — | CeO$_2$ 2.0 | " | 0.2 | 6,890 | 780 |
| 3 | Present invention | " | " | " | 3.0 | 3.0 | — | CeO$_2$ 3.0 | " | 0.1 | 7,140 | 800 |
| 4 | Present invention | " | " | " | 5.0 | 5.0 | — | CeO$_2$ 1.5 | " | 0.1 | 7,050 | 780 |
| 5 | Present invention | " | " | " | 1.5 | 3.0 | — | Y$_2$O$_3$ 3.0 | " | 0.2 | 6,920 | 780 |
| 6 | Present invention | " | " | " | 1.5 | 3.0 | — | La$_2$O$_3$ 3.0 | " | 0.2 | 6,810 | 770 |
| 7 | Present invention | " | " | " | — | 2.5 | 1.5 | CeO$_2$ 3.0 | " | 0.2 | 6,780 | 760 |
| 8 | Present invention | " | " | " | — | 3.0 | 1.5 | Y$_2$O$_3$ 3.0 | " | 0.3 | 6,750 | 760 |
| 9 | Present invention | " | " | " | 2.0 | — | 3.0 | CeO$_2$ 2.0 | " | 0.3 | 6,690 | 750 |
| 10 | Present invention | " | " | " | 2.5 | — | 3.0 | Y$_2$O$_3$ 2.0 | " | 0.4 | 6,710 | 750 |
| 11 | Present invention | " | 40 | " | 1.0 | 1.0 | 1.0 | CeO$_2$ 2.0 | " | 0.3 | 7,080 | 800 |
| 12 | Present invention | " | " | ≦5 | 2.0 | 2.5 | — | CeO$_2$ 2.5 | " | 0.2 | 7,210 | 810 |
| 13 | Present invention | " | " | ≦10 | 3.0 | 3.0 | — | Pr$_6$O$_{11}$ 2.0 | " | 0.2 | 6,790 | 770 |
| 14 | Present invention | " | " | " | 3.0 | 3.0 | — | Nd$_2$O$_3$ 2.0 | " | 0.4 | 6,510 | 720 |
| 15 | Present invention | " | " | " | 3.0 | 3.0 | — | Gd$_2$O$_3$ 2.0 | " | 0.6 | 6,670 | 760 |
| 16 | Present invention | " | " | " | 3.0 | 3.0 | — | Dy$_2$O$_3$ 2.0 | " | 0.3 | 6,810 | 770 |
| 17 | Present invention | " | " | " | 3.0 | 3.0 | — | Ho$_2$O$_3$ 2.0 | " | 0.6 | 6,510 | 720 |
| 18 | Present invention | " | " | " | 3.0 | 3.0 | — | Er$_2$O$_3$ 2.0 | " | 0.2 | 6,910 | 780 |

As mentioned above in detail, the sintered silicon nitride bodies according to the invention have high density, mechanical strength and thermal shock resistance and can be manufactured by a simple and common sintering method without using a special method such as hot-pressing method and the like.

What is claimed is:

1. A sintered silicon nitride body consisting essentially of not more than 10% by weight in total of at least two metal oxides selected from the group consisting of beryllium oxide, magnesium oxide and strontium oxide, provided that each of said metal oxides is not more than 5% by weight, and the remainder of silicon nitride.

2. A sintered silicon nitride body as claimed in claim 1, wherein the total amount of said metal oxides is 0.2–10% by weight and the amount of each of said metal oxides is 0.1–5% by weight.

3. A sintered silicon nitride body as claimed in claim 2, wherein the total amount of said metal oxides is 1–7% by weight and the amount of each of said metal oxides is 0.5–3.5% by weight.

4. A sintered silicon nitride body as claimed in claim 1, wherein the combination of said metal oxides is a combination of beryllium oxide with magnesium oxide and/or strontium oxide.

5. A sintered silicon nitride body as claimed in claim 1, wherein said body further contains not more than 10% by weight of at least one rare earth metal oxide.

6. A sintered silicon nitride body as claimed in claim 5, wherein said rare earth metal oxide is selected from the group consisting of cerium oxide, yttrium oxide, lanthanum oxide, praseodymium oxide, neodymium oxide, samarium oxide, gadolinium oxide, dysprosium oxide, holmium oxide and erbium oxide.

7. A sintered silicon nitride body as claimed in claim 5, wherein the amount of said rare earth metal oxide is 1–10% by weight.

8. A sintered silicon nitride body as claimed in claim 7, wherein the amount of said rare earth metal oxide is 1–5% by weight.

9. A sintered silicon nitride body as claimed in claim 5, wherein said body contains a combination of magnesium oxide and strontium oxide with at least one rare earth metal oxide.

10. A sintered silicon nitride body as claimed in claim 9, wherein said rare earth metal oxide is selected from the group consisting of cerium oxide, yttrium oxide and lanthanum oxide.

11. A sintered silicon nitride body as claimed in claim 1, wherein said at least two metal oxides are beryllium oxide and magnesium oxide.

12. A sintered silicon nitride body as claimed in claim 1, wherein said at least two metal oxides are beryllium oxide and strontium oxide.

13. A sintered silicon nitride body as claimed in claim 1, wherein said at least two metal oxides are magnesium oxide and strontium oxide. e 14. A sintered silicon nitride body as claimed in claim 1, wherein the sintered silicon nitride body is substantially completely $\beta$-phase silicon nitride and illustrates increased mechanical strength and increased thermal shock resistance.

* * * * *